(12) United States Patent
Damron

(10) Patent No.: US 6,725,363 B1
(45) Date of Patent: Apr. 20, 2004

(54) METHOD FOR FILTERING INSTRUCTIONS TO GET MORE PRECISE EVENT COUNTS

(75) Inventor: Peter Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 575 days.

(21) Appl. No.: 09/629,317

(22) Filed: Jul. 31, 2000

(51) Int. Cl.7 .................................. G06F 9/44
(52) U.S. Cl. ........................ 712/227; 717/127
(58) Field of Search ................ 712/227; 717/124, 717/127, 128, 131, 158

(56) References Cited

U.S. PATENT DOCUMENTS

| | | | |
|---|---|---|---|
| 5,107,418 A | | 4/1992 | Cramer et al. ............. 395/700 |
| 5,659,754 A | | 8/1997 | Grove et al. .............. 395/709 |
| 5,790,859 A | | 8/1998 | Sarkar ...................... 395/704 |
| 5,822,788 A | | 10/1998 | Kahn et al. ................ 711/213 |
| 5,956,477 A | * | 9/1999 | Ranson et al. ............. 714/30 |
| 6,000,044 A | * | 12/1999 | Chrysos et al. ............ 714/47 |
| 6,026,139 A | * | 2/2000 | Hady et al. ................ 377/13 |
| 6,175,913 B1 | * | 1/2001 | Chesters et al. ........... 712/227 |
| 6,295,613 B1 | * | 9/2001 | Bates et al. ............... 714/43 |
| 6,470,492 B2 | * | 10/2002 | Bala et al. ................ 717/128 |
| 6,557,119 B1 | * | 4/2003 | Edwards et al. ............ 714/38 |
| 6,668,372 B1 | * | 12/2003 | Wu .......................... 717/130 |

FOREIGN PATENT DOCUMENTS

EP    1 063 585    12/2000

* cited by examiner

Primary Examiner—Eric Coleman
(74) Attorney, Agent, or Firm—Thelen Reid & Priest LLP; Adrienne Yeung

(57) ABSTRACT

This invention provides for filtering instructions to obtain more precise event counts with a plurality of instructions having a counter enable bit, executing the instructions thereby causing a plurality of events, filtering the instructions, activating the counter enable bit if the instructions fall within the filter, which then determines whether an event counter coupled to the event is incremented.

19 Claims, 3 Drawing Sheets

METHOD FOR FILTERING INSTRUCTIONS TO GET MORE PRECISE EVENT COUNTS

BACKGROUND OF THE INVENTION

1. Field of the Invention

This invention relates to computer systems, and more particularly an apparatus, method and system to filter instructions to achieve more precise event counts.

2. Description of Related Art

Collecting performance data in an operating computer system is a frequent and extremely important task performed by hardware and software engineers. Hardware engineers need performance data to determine how computer hardware operates with operating systems and application programs. Specific designs of hardware structures, such as processor, memory and cache, can have drastically different, and sometimes unpredictable, utilizations for the same set of programs. Performance data can identify how efficiently software uses hardware, and can be helpful in designing improved systems.

It is a problem to accurately monitor the performance of hardware systems without disturbing the operating environment of the computer system, particularly if the performance data is collected over extended period of time such as days, or weeks. In some cases, performance monitoring systems are hand crafted. Costly hardware and software modifications may need to be implemented to ensure that operations of the system are not affected by the monitoring system.

Other profiling systems known in the art collect performance data relating to how frequently instructions are executed. Some prior art profiling systems require that source or object programs be modified to insert instructions which can collect the data when the programs are executing. Modifying the programs means that the programs need to be recompiled and/or relinked.

Additionally, prior art profiling systems generally only determine the frequency of execution of particular instructions, and not where time is spent overall in a program. In a pipelined multi-processor system, the number of cycles required to issue the various instructions is a significant indicator of the performance of the system.

Other known profiling systems can only generate profiles for instructions of an application program. This means that when the application program calls an operating system procedure, no performance data on actual instructions executed by the system procedure are collected. Some profiling systems may measure the amount of time it took to process the system call, and attempt to infer performance data by dividing the time for processing a system call by some "average" execution time of instructions. However, nothing concrete is learned about the actual execution of instructions of system procedures.

One way that the performance of a computer system can be monitored is by using performance counters. The performance counters are able to "count" occurrences of significant events in the system such as cache misses, instructions executed, cycle counts, and so forth. By checking the counters, the performance of the system can be deduced.

The counters could also be used to count the events to determine where time is spent overall in a program. It would be efficient to study the performance of the system if the event counters were on the processing chip itself and use software to extract the performance data from the event counters on the chip.

Thus, there is a need to study the performance of a system without modifying the existing system software. This is also a need for a more efficient method and system to study the performance of the system by applying an event counter onto the hardware itself. There is also a need for a more precise method and system to filter instructions to determine where time or resources are spent in a program rather than utilizing "averages" of counters.

SUMMARY OF THE INVENTION

This invention provides for an apparatus, method, and system for filtering instructions to obtain more precise event counts.

A first aspect of this invention is a method whereby a counter enable bit is registered with a plurality of instructions, executing the instructions thereby causing a plurality of events, filtering the instructions, activating the counter enable bit if the instructions fall within the filter, which then determines whether the event counter coupled to the event is incremented.

A second aspect of this invention is an apparatus to obtain more precise event counts which has a plurality of instructions with corresponding counter enable bits, a filter means to filter the instructions, a plurality of events associated with the plurality of instructions, and each plurality of events having a corresponding event counter incremented in response to the corresponding counter enable bit.

A last aspect of this invention is a system for filtering instructions to obtain more precise event counts having a counter enable bit registered to each of a plurality of instructions, executing the instructions thereby creating a plurality of events having associated event counters, means to filter the instructions, activating the counter enable bit if the instruction is filtered, deactivating the counter enable bit if the instruction is not filtered, and incrementing the associated event counter based upon the counter enable bit.

BRIEF DESCRIPTION OF THE DRAWINGS

The accompanying drawings, which are incorporated in and constitute a part of this Specification, illustrate one or more embodiments of the invention and, together with the present description, serve to explain the principles of the invention.

In the drawings.

DESCRIPTION OF THE PREFERRED EMBODIMENTS

One embodiment of the present invention is described herein in the context of filtering instructions to obtain precise event counts. Those of ordinary skill in the art will realize that the following description of the present invention is illustrative only and not in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all the routine features of the implementations described herein are described. It will of course be appreciated that in the development of any such actual implementation, numerous implementation-specific decisions must be made to achieve a developers specific goals, such as compliance with system and business related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Figure 1:
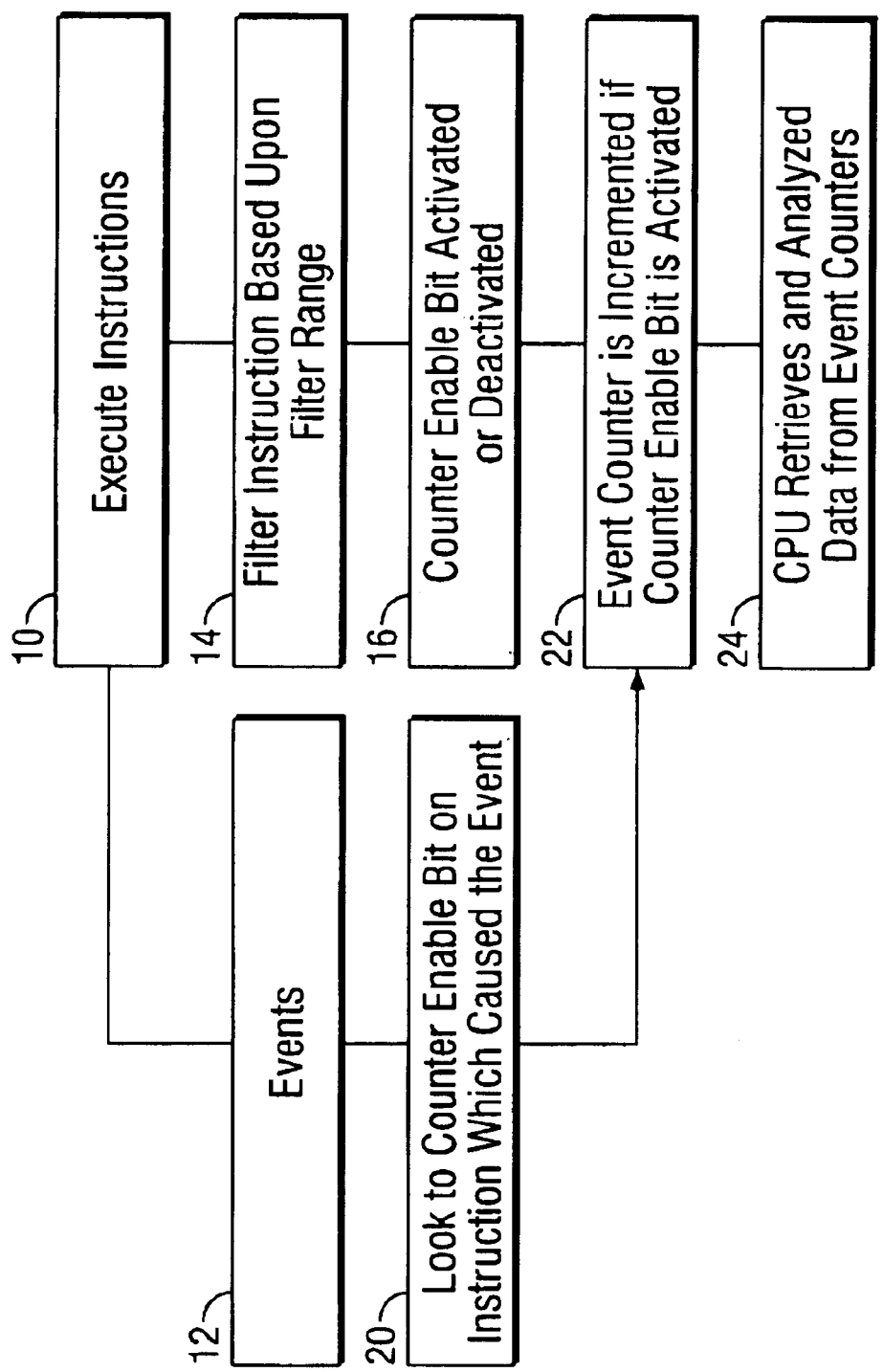
FIG. 1 is a flow chart of one embodiment of the present invention.

Referring to FIG. 1, this invention provides for a method for obtaining precise event counts in a computer system with a single or multiple processors. The computer system executes a plurality of instructions 10 having its own counter enable bit. Execution of each instruction causes numerous events to occur 12, each event having an associated event counter. Each instruction is filtered through a filter 14 which either activates or deactivates the counter enable bit 16.

The plurality of instructions may be various instructions ranging from accessing a virtual address or a physical address, conducting an instruction operation code, a cache miss, a program counter, or the like. The type of instruction filtered through the filter is determined by what events the user would like to count. Thus, based upon the instructions, the filter may be set to filter certain instructions such as instructions which access virtual addresses, or instructions with a cache miss value.

The filter may also filter the instructions based upon various methods known in the art. As an illustration, the filter range may encompass a high number and a low number whereby if the instruction is a number between the high number and the low number, then the counter enable bit will be activated. If the instruction does not have a number between the high number and the low number, then the counter enable bit will be deactivated.

Another filter range example is a mask and compare operation whereby a range having a number number and a compare number is predetermined. The user chooses a certain number, which is the mask number. A boolean-and operation with the mask number is compared to the compare number. Should the comparison be equal, the counter enable bit is activated. If the mask number is not found, then the counter enable bit is deactivated.

Each instruction, once executed, causes numerous events to occur 12. Each event has an associated event counter that can be set to 0. Once the event occurs, the event will look to the instruction that caused the event 20. If the counter enable bit on the corresponding instruction is activated, the associated event counter will be incremented 22. If the counter enable bit is deactivated, the associated event counter will not be incremented.

Each event counter is coupled to a processor for analyses to determine where time and resources are spent in the computer system 24. The event counter number will convey the number of times the event was executed. A user can then use this information for many useful purposes such as to debug a computer program, develop more efficient computer systems, or develop more efficient hardware or. software.

Figure 2:
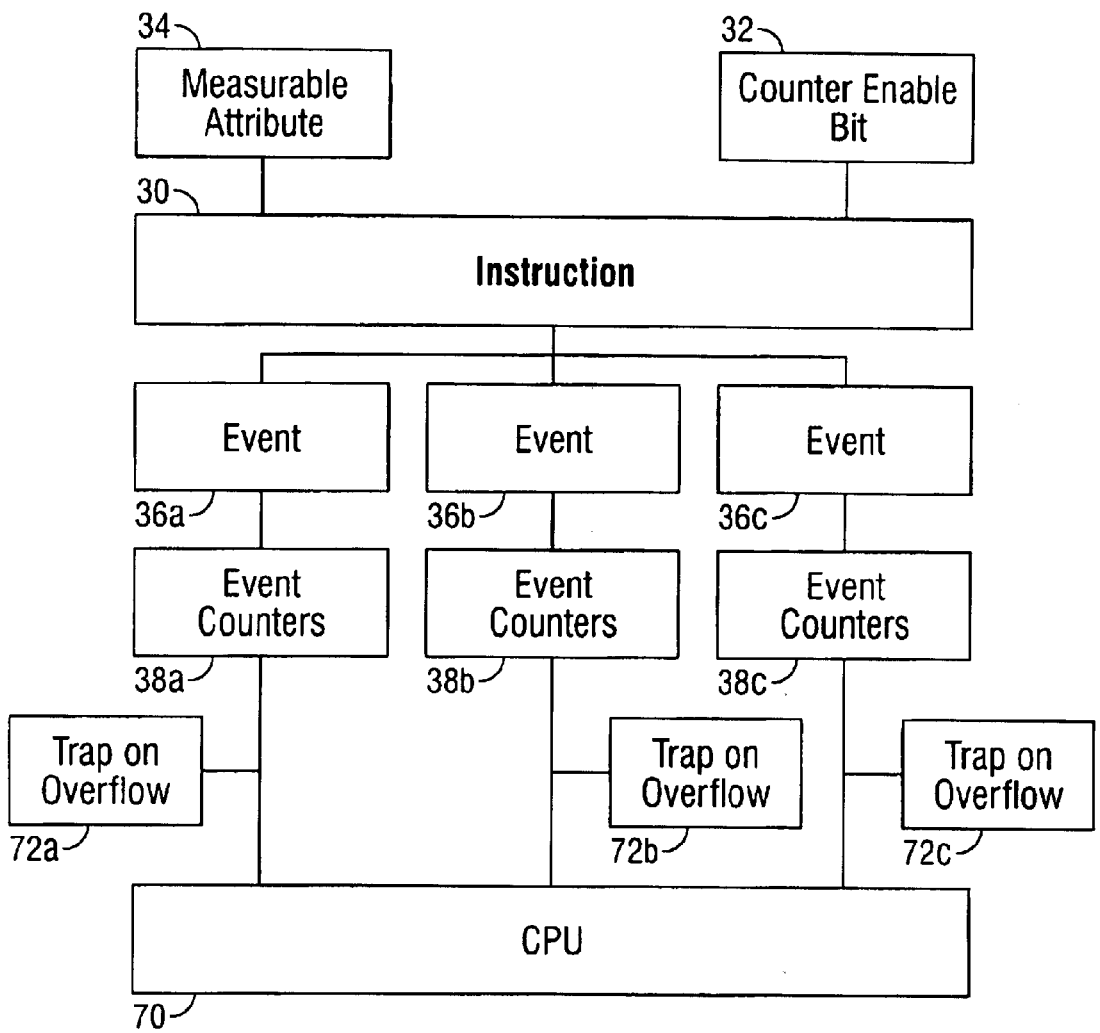
FIG. 2 is a diagram of the present invention.
Figure 3:
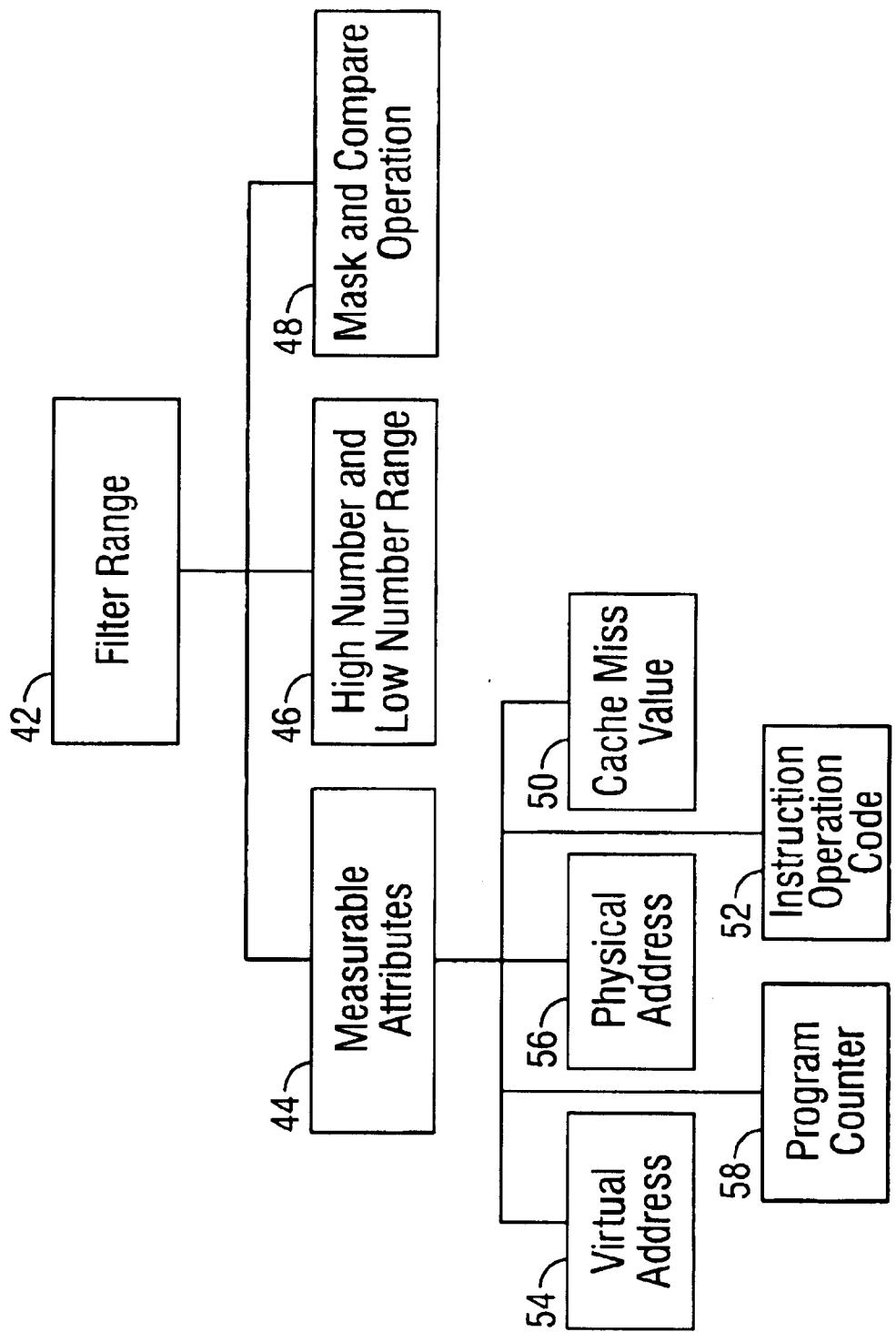
FIG. 3 is a diagram of one embodiment of the filter means of the present invention.

Referring to FIGS. 2 and 3, this invention provides for an apparatus to obtain more precise event counts in a computer system with single or multiple processors. Each instruction 30 (the figure herein shows only one instruction) within the computer system has its own counter enable bit 32 and a measurable attribute 34, and when the instruction is executed, numerous events 36a, 36b, 36c occur. The user may define the measurable attribute 34 of the instruction 30 based upon what instructions and events the user wants to focus upon. For example, a user may want to focus on instructions and events only for certain a virtual address. Hence, the measurable attribute will be those instructions and events dealing with the certain virtual address.

The counter enable bit is activated or deactivated based upon applying the measurable attribute 44 (FIG. 3) through the filter range 42 of the filter. Each instruction may be filtered based upon the measurable attribute 44. For example, only instructions applying to cache misses 50, or instruction operation codes 52, or a combination of both are filtered through the filter range. A user may request filtering of any type of measurable attribute 44 of an instruction known in the art such as virtual address 54, physical address 56, program counter values 58, and the like.

The filter range 42 may comprise a variety of other filter methods known in the art. One such example is a simple filter range with a high number and a low number 46. Should the measurable attribute 44 fall within the high number and low number, the counter enable bit is activated. If the measurable attribute 44 does not fall between the high number and low number, then the counter enable bit is deactivated. Another example is a mask and compare operation 48 where a boolean-and operation with a mask number is compared to a compare number. Thus, there is a mask number and a compare number, and if the comparison is equal between the mask number and compare number, then the counter enable bit is activated. The mask number may even occur several times between the high number and the low number. If the comparison is not equal, then the counter enable bit is deactivated.

Each event 36a, 36b, 36c has an associated event counter 38a, 38b, 38c which is incremented in response to the respective counter enable bit 32. Once the events 36a, 36b, 36c occur, the events 36a, 36b, 36c then look to the instruction 30 which caused it. If the counter enable bit 32 is activated, then the associated event counter 38a, 38b, 38c is incremented. If the counter enable bit 32 is deactivated, then the event counter 38a, 38b, 38c is not incremented.

The event counters 38a, 38b, 38c are connected to a processor 70 which is able to access and analyze the data. This will allow a user to determine more precisely where time and resources are spent in the computer system. A user can use this information to debug a computer program or to develop more efficient computer systems.

This invention also provides for a system for filtering instructions to obtain more precise event counts in a computer system having single or multiple processors. A counter enable bit 32 is registered with each instruction 30 in a computer system. The instructions 30 are filtered through a filter based upon various methods known in the art. For example, the filter range 42 may filter instructions based upon the type of instruction 44 such as instructions dealing with instruction operation codes 52, instructions dealing with cache miss values 50, or a combination of both. Other types of instructions may deal with virtual addresses 54, physical addresses 56, program counters 58, or the like.

Another filter method known in the art is a filter range with a high number and a low number 46, a mask and compare operation 48, any combination of either or other filter methods known in the art. If an instruction falls within a range of numbers or is the mask number within the range of numbers, the counter enable bit will be activated. If the instruction does not fall within the range of numbers or the mask number and compare does not succeed, then the counter enable bit will be deactivated.

After an event 36a, 36b, 36c occurs, the event counter 38a, 38b, 38c may be incremented based upon the corresponding counter enable bit 32. Specifically, the event 36a, 36b, 36c will look to the instruction 30 which caused the event 36a, 36b, 36c. If the counter enable bit 32 on the instruction 30 is activated, then the event counter 36a, 36b, 36c will be incremented. If the counter enable bit 32 on the instruction 30 is deactivated, then the event counter 38a, 38b, 38c will not be incremented.

The event counters 38a, 38b, 38c are coupled to a processor 70, which is able to access the data to determine where time and resources are spent in the computer system. The number of times an event occurred may be determined precisely and accurately which will enable a user to debug a computer program or to develop more efficient computer systems.

In the above apparatus, method, or system, there are situations where an event counter may reach a maximum number. Once that maximum number is reached, the event counter will be directed to a trap on overflow 72a, 72b, 72c so that the event counter may be again set to 0 and continue counting. This allows for an efficient and accurate count of the event occurrence.

While embodiments and applications of this invention has been shown and described, it would be apparent to those skilled in the art that many more modifications than mentioned above are possible without departing from the inventive concepts herein. Thus, what has been disclosed is merely illustrative of the present invention and other arrangements or methods can be implemented by the those skilled in the art without departing from the spirit and scope of the present invention.

I claim:

1. A method for obtaining precise event counts in a computer system, said method comprising:
   executing an instruction, said execution creating one or more associated events;
   filtering said instruction based on a filter range, said filter range providing a range of instructions indicating events to be counted;
   activating a counter enable bit in said instruction if said instruction is within said filter range;
   deactivating said counter enable bit in said instruction if said instruction is not within said filter range; and
   incrementing an associated event counter corresponding to each of said one or more associated events if said counter enable bit on said instruction is activated.

2. The method of claim 1 further comprising:
   trapping said associated event counter when it reaches a maximum bit count.

3. The method of claim 1 further comprising:
   setting said filter range substantially between a high number and a low number.

4. The method of claim 1 further comprising:
   setting said filter range on a mask and compare operation.

5. The method of claim 1 wherein said filtering further comprises:
   filtering said instruction based on an effective virtual address value.

6. The method of claim 1 wherein said filtering further comprises:
   filtering said instruction based on an effective physical address value.

7. The method of claim 1 wherein said filtering further comprises:
   filtering said instruction based on an instruction operation code.

8. The method of claim 1 wherein said filtering further comprises:
   filtering said instruction based on a cache miss value.

9. The method of claim 1 wherein said filtering further comprises:
   filtering said instruction based on a program counter value.

10. A program storage device readable by a machine, tangibly embodying a program of instructions executable by the machine to perform a method for obtaining precise event counts in a computer system, said method comprising:
    executing an instruction, said execution creating one or more associated events;
    filtering said instruction based on a filter range, said filter range providing a range of instructions indicating events to be counted;
    activating a counter enable bit in said instruction if said instruction is within said filter range;
    deactivating said counter enable bit in said instruction if said instruction is not within said filter range; and
    incrementing an associated event counter corresponding to each of said one or more associated events if said counter enable bit on said instruction is activated.

11. An apparatus for obtaining precise event counts in a computer system, said apparatus comprising:
    means for executing an instruction, said execution creating one or more associated events;
    means for filtering said instruction based on a filter range, said filter range providing a range of instructions indicating events to be counted;
    means for activating a counter enable bit in said instruction if said instruction is within said filter range;
    means for deactivating said counter enable bit in said instruction if said instruction is not within said filter range; and
    means for incrementing an associated event counter corresponding to each of said one or more associated events if said counter enable bit on said instruction is activated.

12. The apparatus of claim 11 further comprising:
    means for trapping said associated event counter when it reaches a maximum bit count.

13. The apparatus of claim 11 further comprising:
    means for setting said filter range substantially between a high number and a low number.

14. The apparatus of claim 11 further comprising:
    means for setting said filter range on a mask and compare operation.

15. The apparatus of claim 11 wherein said means for filtering further comprises:
    means for filtering said instruction based on an effective virtual address value.

16. The apparatus of claim 11 wherein said means for filtering further comprises:
    means for filtering said instruction based on an effective physical address value.

17. The apparatus of claim 11 wherein said means for filtering further comprises:
    means for filtering said instruction based on an instruction operation code.

18. The apparatus of claim 11 wherein said means for filtering further comprises:

means for filtering said instruction based on a cache miss value.

19. The apparatus of claim 11 wherein said means for filtering further comprises:

means for filtering said instruction based on a program counter value.

* * * * *